United States Patent
West

Patent Number: 5,956,889
Date of Patent: Sep. 28, 1999

[54] HYDROPLANING AIRBORNE FISHING DEVICE

[76] Inventor: Michael Gene West, 3102 O'Henry, Garland, Tex. 75042

[21] Appl. No.: 08/934,922

[22] Filed: Sep. 22, 1997

[51] Int. Cl.$^6$ .................................................. A01K 97/00
[52] U.S. Cl. ........................ 43/43.13; 43/42.22; 43/42.5
[58] Field of Search .............................. 43/43.13, 42.03, 43/42.22, 42.5, 44.2, 42.15

[56] References Cited

U.S. PATENT DOCUMENTS

| | | | |
|---|---|---|---|
| 1,875,122 | 8/1932 | Olson | 43/43.13 |
| 2,531,235 | 11/1950 | Sicotte | 43/43.13 |
| 2,588,300 | 3/1952 | Smith | 43/42.5 |
| 2,726,475 | 12/1955 | Wiselka | 43/43.13 |
| 2,997,804 | 8/1961 | Creason | 43/43.13 |
| 3,023,537 | 3/1962 | Madson | 43/42.22 |
| 3,094,804 | 6/1963 | Walton | 43/43.13 |
| 3,135,065 | 6/1964 | Cromoga | 43/43.13 |
| 3,238,660 | 3/1966 | Pcola | 43/43.13 |
| 3,401,483 | 9/1968 | Bellah | 43/43.13 |
| 3,543,431 | 12/1970 | Olds | 43/43.13 |
| 3,738,046 | 6/1973 | Johnson | 43/43.13 |
| 3,874,109 | 4/1975 | Peterson | 43/42.22 |
| 4,026,061 | 5/1977 | Schuman | 43/43.13 |
| 4,161,078 | 7/1979 | Pagani | 43/43.13 |
| 4,180,936 | 1/1980 | Davis | 43/42.5 |
| 4,237,644 | 12/1980 | Hansen | 43/43.13 |

Primary Examiner—Kurt Rowan

[57] ABSTRACT

A fishing lure device that, upon retrieval, will ascend in an upwardly direction toward the surface of the water. The device consists of a horizontal vane that can ascend with enough force as to penetrate the water's surface and become airborne, thereby simulating a foraging animal. The device may be augmented with some artificial or live bait that may increase the likelihood of attracting a fish.

1 Claim, 3 Drawing Sheets

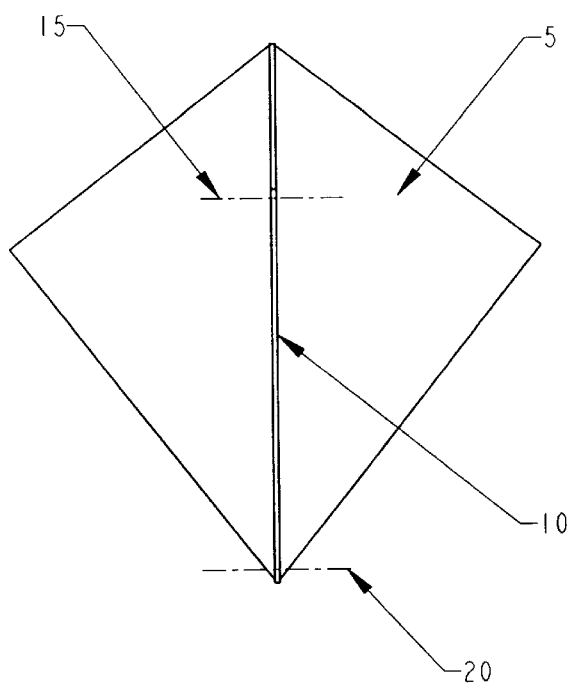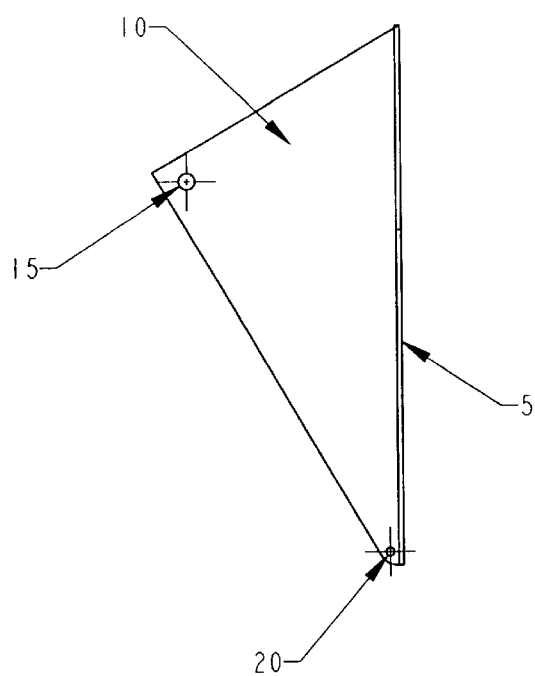
Fig 1                    Fig 2

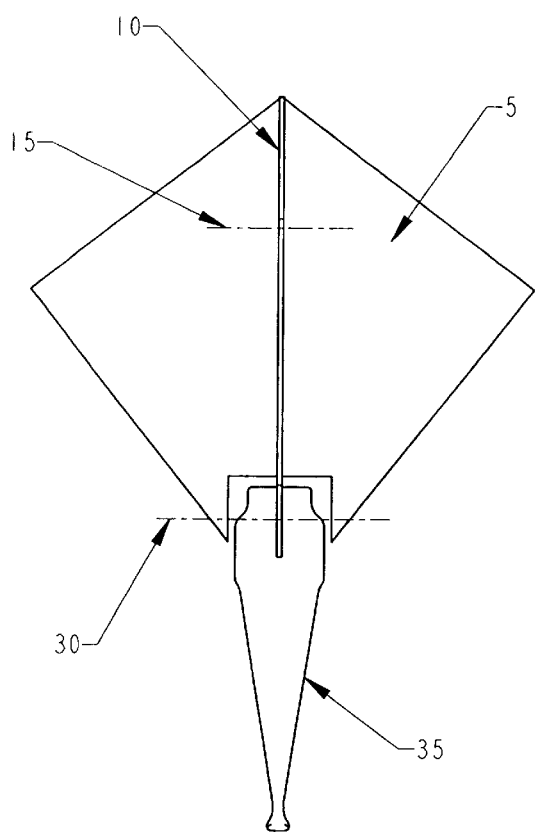
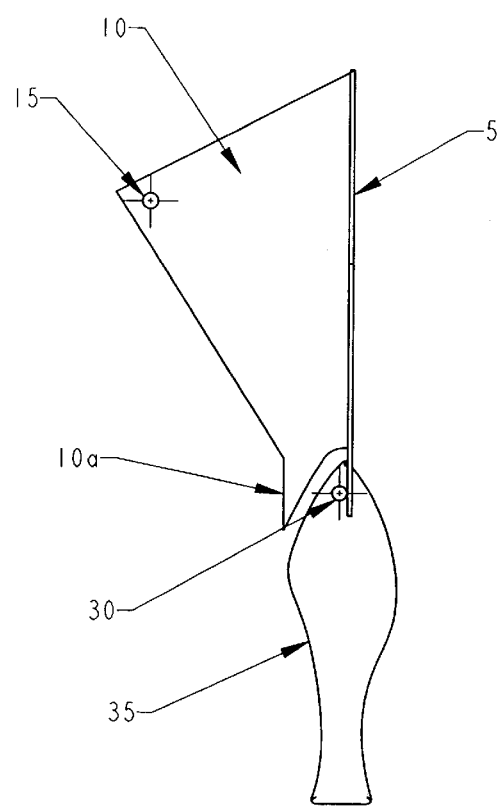
Fig 5
Fig 6

HYDROPLANING AIRBORNE FISHING DEVICE

BACKGROUND OF THE INVENTION

Various forms of previously developed fishing lure devices may be cited as prior art. Most of these earlier developments rely upon a hydroplaning effect wherein a fishing hook or an artificial bait arrangement ascends or descends through a given body of water. Some of these works accomplish this hydroplaning effect by way of weight distribution, while others may rely upon rotary movement. All of these related developments use the hydroplaning effect to increase or decrease the depth of a fishing hook assembly within a body of water.

Some prior art has been described as having the ability to mimic a feeding fish by "jumping" through water. This effect may also be described as a horizontal or vertical change in speed and direction within a given body of water in such a way as to mimic the swimming patterns of a fish

BRIEF SUMMARY OF THE INVENTION

This invention relates to a fishing lure device that, upon retrieval, will ascend in an upwardly direction toward the surface of the water The device consists of a horizontal vane that can ascend with enough force as to penetrate the water's surface and become airborne, thereby simulating a foraging animal.

The object of the subject invention is to ascend through a body of water in a vertical or near vertical direction with enough force as to actually penetrate the surface of the water and become airborne.

One advantage of the preferred embodiment is that the method of retrieval may allow for the hook assembly to ascend in a vertical or near vertical direction as to avoid submerged structures and debris.

Another advantage of the preferred embodiment is that the method of retrieval may allow for the device to actually leave the body of water and become airborne as to avoid structures and debris that may lie on or near the surface.

Another advantage of the subject invention is that the device may be utilized within the confines of certain submerged structures that cannot be reached by conventional lures.

Another advantage of the subject invention occurs when the lure is not being retrieved as the device has a tendency to flutter in a downward direction giving the device the appearance of a dying bait fish.

BRIEF DESCRIPTION OF THE SEVERAL VIEWS OF THE DRAWING

FIG. 1 is a top view of the subject invention.

FIG. 2 is the side view of FIG. 1.

FIG. 5 is the top view of the subject invention wherein the device has been augmented by the attachment of an artificial bait.

FIG. 6 is the side view of FIG. 5.

DETAILED DESCRIPTION OF THE INVENTION

Figures 3, 4:
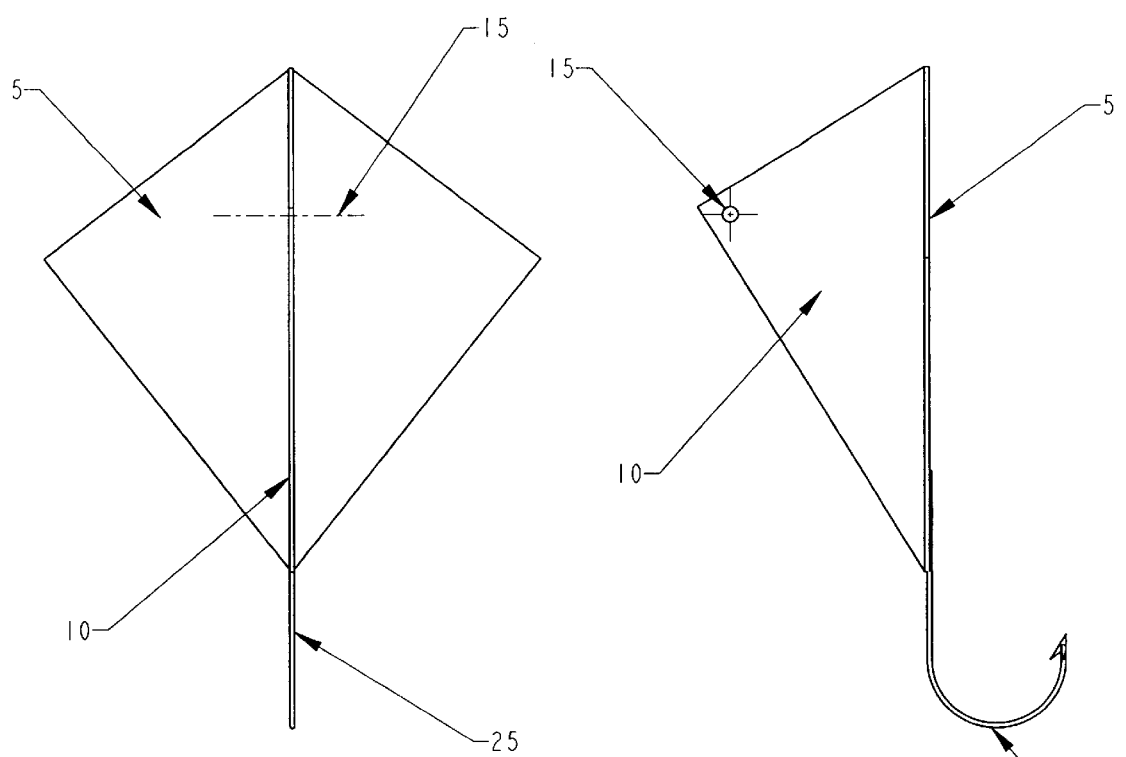
FIG. 3 is the top view of a second possible version of the subject invention.
FIG. 4 is the side view of FIG. 3.

In FIG. 1 and FIG. 2, the main body 5 of the device may be described as a flattened symmetrical plane. A vertical vane 10 is centrally located along the vertical axis of the main body 5. Vertical vane 10 is a thin plane that provides stability to the main body 5 as the device travels through the water. The leading edge of the vertical vane 10 has an attachment hole 15 which allows for the attachment of the device to a fishing line. The bottom of the trailing edge of the vertical vane 10 has an attachment hole 20. Attachment hole 20 provides for the attachment of a hook or artificial bait to the device.

In FIG. 3 and FIG. 4, the vertical vane 10 is attached along the vertical axis of the main body 5. The leading edge of the vertical vane 10 has an attachment hole 15 which allows for the attachment of the device to a fishing line. The shank of a fishing hook 25 is attached to the lower portion of the main body 5.

In FIG. 5 and FIG. 6, the vertical vane 10 is attached along the vertical axis of the main body 5. Attachment hole 15 allows for the attachment of the device to a fishing line. An artificial bait 35 is attached to the body of the device by way of the connecting pin 30. The lower portion of the vertical vane 10a acts as pivot stop for the artificial bait 35. This arrangement allows the main body 5 of the device to pivot so that the artificial bait 35 lies adjacent to the main body 5 upon descent through the water when the device is not being retrieved.

I claim:

1. A fishing device comprising, a planar main body having a pointed front portion and a cut-out portion at a rear end, a planar vertical vane mounted to a surface of said main body in a substantially vertical orientation, said vertical vane having a line attachment hole adjacent a leading edge, said vertical vane having a lower portion with a cut-out section which corresponds to said cut-out portion of said main body, a movable connecting pin mounted to said main body adjacent a rear edge extending parallel to a plane of said main body across said cut-out portion and perpendicular to a longitudinal axis of the main body such that an artificial bait may be inserted into said cut-out portion and said connecting pin may be inserted through the artificial bait to retain the artificial bait to the device with a surface of said cut-out section acting as a pivot stop for the artificial bait.

* * * * *